Oct. 15, 1929.   O. PETERMANN   1,731,935
DOORKNOB CONSTRUCTION
Filed Oct. 1, 1927
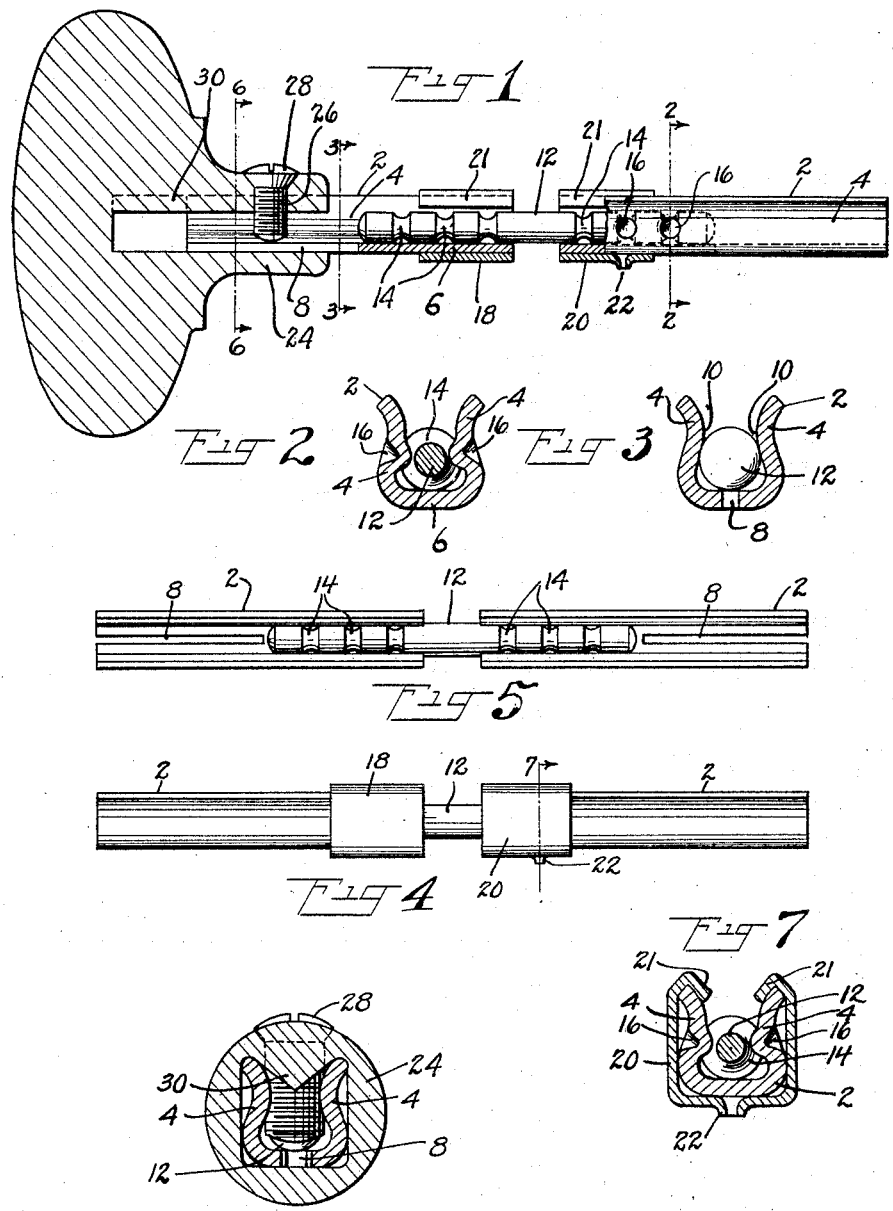

Patented Oct. 15, 1929

1,731,935

UNITED STATES PATENT OFFICE

OTTO PETERMANN, OF GROTON, NEW YORK, ASSIGNOR TO THE AMERICAN HARDWARE CORPORATION, OF NEW BRITAIN, CONNECTICUT, A CORPORATION OF CONNECTICUT

DOORKNOB CONSTRUCTION

Application filed October 1, 1927. Serial No. 223,295.

My improvement relates to door knob constructions and has for one of its objects to provide a sheet metal spindle having two portions swiveled together. It further has for its object to provide in such a spindle enlargements on the inner ends of the swiveled portions. It further has for its object to provide an integral stop on one of said enlargements. It further has for its object to provide means for more easily inserting the spindle holding screw.

The following is a description of an embodiment of my invention, reference being had to the accompanying drawings, in which, Fig. 1 shows a partial longitudinal section of a knob construction embodying my invention;

Fig. 2 is a section of the same on the line 2—2, Fig. 1;

Fig. 3 is a section of the same on the line 3—3, Fig. 1;

Fig. 4 is a side elevation of the spindle of Fig. 1;

Fig. 5 is a plan view of the spindle with the end enlargement omitted;

Fig. 6 is a section on the line 6—6, Fig. 1; and

Fig. 7 is a section on the line 7—7, Fig. 4.

Referring more particularly to the drawings, 2—2 are end portions of the spindle, each portion consisting of two spaced away walls 4 having one edge of each wall connected to the corresponding edge of the other by a peripheral portion 6 so as to form an integral structure. The body of this structure is preferably U-shaped as shown. The outer ends are preferably split so that the end portions of the walls are more readily separable. This is accomplished by the slot 8. The sides of these members are corrugated so as to form internal beads 10, which are recessed so that the outer walls of the corrugated portions are spaced away from the inner walls of the knob socket when introduced therein.

In order to swivel these parts together, I provide a rod 12, the ends of which extend into the inner ends of the end portions 2 being held therein. At least one end portion 2 is so connected that it can turn upon this rod. In order to accomplish this result I preferably provide the rod with one or more circumferential grooves 14 on each of its ends and then by punches force metal from one or both walls of said members into said grooves, as shown at 16. The engagement of the metal with the grooves of one end portion with the rod is such as to permit it to revolve thereon, but hold it from longitudinal movement. The engagement of the other end portion with the rod should prevent relative longitudinal movement and may prevent any relative movement whatsoever.

The construction thus far described is shown in Fig. 5 and constitutes a spindle embodying the swivel feature of my invention suitable for some locks.

When, however, the divided roll back hub of the lock has a larger opening the inner ends of the end portions should be enlarged. In order to accomplish this I provide two members 18 and 20 which are first U-shaped, and placing them on the inner ends of the end portions bend their edges 21 over so as to clamp them in place as shown in Fig. 7. On one of them I form an integral stop 22 by forcing a portion of the metal downward before the member is applied. This is possible because the member is then a U-shaped member with its inside bottom portion accessible. This obviates the necessity of applying a separately formed stud to the enlarging member as has heretofore been customary.

In use the end of the spindle is inserted in the knob socket 24 provided with the hole 26 so that the space between the walls is in alinement with the hole 26 and its walls expanded by a wedging member or screw 28 passing through the hole 26 so as to make binding engagement therewith, as described in my application Serial No. 175,059, filed March 14, 1927.

In securing my channel shanks in position some difficulty is sometimes experienced, particularly when the wall of the socket of the knob is comparatively thin, in holding the screw 28 at right angles to the axis of the spindle while being inserted. In order to render the insertion of the screw easier I form the socket of the knob with a reentrant portion 30 which enters the space between the walls of the spindle. The hole 26 passes through this portion 30. The presence of this portion is possible because the walls of the spindle are spaced away. Since the hole for the screw passes through this projection 30 the screw has on two of its sides guiding surfaces carried by the knob socket which tend to keep it at right angles to the axis of the spindle while being inserted.

This projection also acts as a guide so that the spindle when inserted is always properly alined with the hole 26.

As will be evident to those skilled in the art, my invention permits various modifications without departing from the spirit thereof or the scope of the appended claims.

What I claim is:

1. In a knob construction a spindle consisting of two sheet metal end portions having spaced away walls extending throughout the lengths of said end portions and a rod having elongated ends entering said portions and gripped in position by the walls thereof so as to maintain said rod and end portions in alinement, the connection at one end at least of the rod being a swiveled connection.

2. In a knob construction a spindle consisting of two sheet metal end portions having spaced away walls and a rod entering said portions, and held in position by the walls thereof, said rod having an annular circumferential groove, and one of said portions having indentations forming parts protruding therefrom so as to enter said groove and form a swiveled connection.

3. In a knob construction a spindle consisting of two end portions having spaced away walls, and a rod entering said portions and held in position by the walls thereof, said rod having an annular circumferential groove on each end and said portions having indentations forming parts protruding into said grooves, the connection thus formed being at one end at least of the rod a swiveled connection.

4. In a knob construction a spindle consisting of two U-shaped end portions, a rod entering said portions and held in position by the walls thereof, the connection at one end at least of the rod being a swiveled connection, and strips bent around the inner ends of said U-shaped members and over the edges thereof.

5. In a knob construction a spindle consisting of two sheet metal end portions having spaced away walls, a rod entering said portions and held in position by the walls thereof, the connection at one end at least of the rod being a swiveled connection, and strips bent around the inner ends of said members, one of said strips having a protuberance integral therewith.

6. In a knob construction the combination of a spindle having spaced away walls and a knob having a socket into which the end of such spindle enters and a hole in the wall of said socket in alinement with the space between said walls, said socket having a reentrant portion entering said space and through which said hole passes, and a screw in said hole engaging the inner sides of said walls.

In testimony whereof, I have signed my name to this specification this 29th day of September, 1927.

OTTO PETERMANN.